US011402307B2

(12) United States Patent
Malloggi et al.

(10) Patent No.: US 11,402,307 B2
(45) Date of Patent: Aug. 2, 2022

(54) METHOD FOR CONCENTRATING ANALYTES

(71) Applicant: COMMISSARIAT À L'ÉNERGIE ATOMIQUE ET AUX ÉNERGIES ALTERNATIVES (CEA), Paris (FR)

(72) Inventors: Florent Malloggi, Paris (FR); Kiarach Mesbah, Paris (FR); Sarah Bregant, Paris (FR)

(73) Assignee: COMMISSARIAT À L'ÉNERGIE ATOMIQUE ET AUX ÉNERGIES ALTERNATIVES (CEA), Paris (FR)

( * ) Notice: Subject to any disclaimer, the term of this patent is extended or adjusted under 35 U.S.C. 154(b) by 315 days.

(21) Appl. No.: 16/339,887

(22) PCT Filed: Oct. 6, 2017

(86) PCT No.: PCT/FR2017/052748
§ 371 (c)(1),
(2) Date: Apr. 5, 2019

(87) PCT Pub. No.: WO2018/065741
PCT Pub. Date: Apr. 12, 2018

(65) Prior Publication Data
US 2020/0041393 A1    Feb. 6, 2020

(30) Foreign Application Priority Data
Oct. 7, 2016  (FR) ..................... 1659705

(51) Int. Cl.
*G01N 1/40*    (2006.01)
*B01L 3/00*    (2006.01)
(Continued)

(52) U.S. Cl.
CPC ...... *G01N 1/4022* (2013.01); *B01L 3/502784* (2013.01); *H01J 49/0418* (2013.01);
(Continued)

(58) Field of Classification Search
CPC ....... B01L 3/502784; B01L 2200/0678; B01L 3/5088; G01N 1/40; G01N 1/4022;
(Continued)

(56) References Cited

U.S. PATENT DOCUMENTS

2003/0213905 A1    11/2003  Lennon et al.
2007/0039866 A1     2/2007  Schroeder et al.
(Continued)

FOREIGN PATENT DOCUMENTS

EP    1 582 855 A2    10/2005
EP    2 388 568 A1    11/2011

OTHER PUBLICATIONS

International Search Report dated Jun. 7, 2018 in corresponding International Application No. PCT/FR2017/052748; 9 pages.
(Continued)

*Primary Examiner* — Jill A Warden
*Assistant Examiner* — Dwayne K Handy
(74) *Attorney, Agent, or Firm* — Maier & Maier, PLLC

(57) ABSTRACT

A method for concentrating at least one analyte including the following steps: preparing a first phase including at least one analyte; depositing a drop of the first phase on a substrate; depositing on the drop of first phase a drop of a second liquid phase including at least one surfactant, the second phase being non-miscible with the first phase; evaporating the drop of the second phase; and evaporating the drop of the first phase. Also relates to a method for detecting at least one analyte using the concentration method; and a system using the detection method.

6 Claims, 4 Drawing Sheets

(51) Int. Cl.
    *H01J 49/04* (2006.01)
    *H01J 49/40* (2006.01)
(52) U.S. Cl.
    CPC ....... *H01J 49/40* (2013.01); *B01L 2200/0678* (2013.01); *G01N 2001/4027* (2013.01)
(58) Field of Classification Search
    CPC .... G01N 2001/4027; G01N 2035/1034; H01J 49/0418
    See application file for complete search history.

(56) References Cited

U.S. PATENT DOCUMENTS

| | | |
|---|---|---|
| 2015/0118696 A1 | 4/2015 | Haselton et al. |
| 2016/0086785 A1* | 3/2016 | Chiu .................. H01J 49/0445 250/282 |

OTHER PUBLICATIONS

Simon K Küster et al., "Interfacing Droplet Microfluidics with Matrix-Assisted Laser Desorption/Ionization Mass Spectrometry: Label-Free Content Analysis of Single Droplets", Analytical Chemistry, Jan. 5, 2013, pp. 1285-1289.

Van Nguyen Truskett et al., "Influence of Surfactants on an Evaporating Drop: Fluorescence Images and Particle Deposition Patterns", Langmuir vol. 19, No. 20, Septembers, 2003, pp. 8271-8279.

Jean-Christophe Baret, "Surfactants in droplet-based microfluidics", Lab on a Chip, vol. 12, No. 3, Oct. 20, 2011, pp. 422-433.

Philipp Gruner et al., "Stabilisers for water-in-fluorinated-oil dispersions: Key properties for microfluidic applications", Current Opinion in Colloid & Interface Science, vol. 20, No. 3, Jul. 30, 2015, pp. 183-191.

Linas Mazutis et al., "Single-cell analysis and sorting using droplet-based microfluidics", Nature Protocols, vol. 3, No. 5, Apr. 4, 2013, pp. 870-891.

Balamurugan Subramanian et al., "Surface Modification of Droplet Polymeric Microfluidic Devices for the Stable and Continuous Generation of Aqueous Droplets", LAGMUIR, vol. 27, No. 12, Jun. 21, 2001, pp. 7949-7957.

Robert D. Deegan, "Pattern formation in drying drops", Physical Review E, vol. 61, No. 1, Jan. 2000, pp. 475-485.

Tadashi Kajiya et al., "Controlling the Drying and Film Formation Processes of Polymer Solution Droplets with Addition of Small Amount of Surfactants", J. Phys. Chem., Nov. 4, 2009, pp. 15460-15466.

Van X. Nguyen et al., "Patterning of Small Particles by a Surfactant-Enhanced Marangoni-Bénard Instability", Physical Review Letters, vol. 88, No. 16, Apr. 22, 2002, pp. 164501-1-164501-4.

* cited by examiner

METHOD FOR CONCENTRATING ANALYTES

FIELD OF THE INVENTION

The present invention relates to the fields of biology and diagnostics. In particular, the present invention relates to a method for concentrating analytes.

STATE OF THE RELATED ART

Most analysis techniques used for detecting analytes in solution consist of depositing a drop of low volume of a solution containing analytes onto a suitable substrate for the desired analysis technique. The evaporation of the drop induces a distribution of the analytes over the entire contact surface between the drop and the substrate, resulting in what is commonly referred to as "the coffee ring effect". Indeed, when the droplet evaporates, flows are spontaneously produced due to non-uniform evaporation along the interface. "The coffee ring effect" is a physical phenomenon that occurs when a colloidal suspension evaporates on a solid substrate (Deegan et al., Nature, 1997, 389, 827-829): the suspended material is deposited preferentially at the level of the contact line between the drop and the substrate thus forming a deposition ring. In the case of low-concentration analyte solutions, the detections thereof and identifications thereof are rendered difficult by this distribution of the analytes at the level of the contact line between the drop and the substrate and are then limited by the sensitivity of the analytical tools. Furthermore, for an effective and high-quality analysis, the depositions must be homogeneous and reproducible from one drop to another.

It is known to use an electrowetting method in order to inhibit "the coffee ring effect" by preventing the anchoring of the contact line of the drop onto the substrate. For example, the document EP 2388568 describes a device for treating drops made up of a substrate comprising two interdigital electrodes embedded in said substrate. Upon the application of an alternating current, the contact line between the drop and the substrate is kept in motion. During the drying of the drop, the analyte therefore cannot be distributed along the contact line and is concentrated. However, this type of device is complex and requires the use of a particular substrate equipped with electrodes.

It is also known to those skilled in the art that "the coffee ring effect" disappears when Marangoni flows are produced in the drop (Deegan et al., Physical Review E, 2000, 61, 475-485). These flows occur once there is a surface tension gradient along the drop interface, the liquid then flows from the regions of the lowest surface tension to the regions of the greatest surface tension. The recirculations then induced by the Marangoni flows in the drop make it possible to concentrate species of all types and of all sizes (crystals, biomolecules, peptides, proteins, nanoparticles or microparticles) present in the sample. These flows may be activated by different mechanisms, particularly by the thermocapillary effect, that is to say the application of a temperature gradient which induces a surface tension gradient. It is known that for substrates of very low thermal conductivity, Marangoni flows are generated from the contact line towards the centre of the drop. The document US 2015/0118696 describes a diagnostic device using this mechanism and making it possible to concentrate analytes supported on micrometric particles. However, such a device requires a particular liquid/substrate pair, namely the thermal conductivity of the substrate must be 1.6 times lower than that of the liquid. The choice of liquid containing the analytes to be studied and of the substrate used is therefore limited to a restricted number of potential pairs.

A further method for creating Marangoni flows consists of creating a surfactant concentration gradient which generates a surface tension gradient. It is known that mixing a colloidal suspension with a surfactant makes it possible to induce a solutocapillary effect which makes it possible to concentrate the analytes at the centre of the deposition zone (Deegan et al., Physical Review E, 2000, 61, 475-485). However, this method induces contamination of the solution of analytes with the surfactants and therefore does not facilitate the detection thereof.

The document Küster et al. describes the deposition of drops comprising an analyte on a MALDI plate with a view to a matrix-assisted laser ionisation source mass spectrometry analysis (Analytical Chemistry, 2013, 85, 1285-1289). The drops comprising the analyte are dispersed in an oily phase prior to the deposition thereof. Such a method does not enable the concentration of the analyte at the centre of the deposition zone of the drop. The document Nguyen Trusket et al. describes the influence of surfactants on the evaporation of a drop, more specifically on the deposition pattern of particles contained in the drop during evaporation. (Langmuir 2003, 19, 8271-8279). It describes a method comprising the formation of a drop comprising particles, the spraying of a surfactant, pentadecanoic acid, on the surface of the drop on a substrate, and the evaporation of the drop. However, such a method is not suitable for concentrating the particles at the centre of the deposition zone of the drop. Indeed, after evaporation, the particles initially present in the drop are not concentrated at the centre of the drop and a "coffee ring" effect is clearly observable.

The aim of the present invention is therefore that of providing a method for concentrating analytes enabling a homogeneous, reproducible, contamination-free deposition of said analytes on all types of substrate to enable the detection of lower analyte concentrations than that permitted by conventional methods.

SUMMARY

The invention relates to a method for concentrating at least one analyte comprising the following steps:
preparing a first phase comprising at least one analyte;
depositing a drop of said first phase on a substrate;
depositing on said drop of first phase a drop of a second liquid phase comprising at least one surfactant, said second phase being non-miscible with said first phase;
evaporating the drop of the second phase; and
evaporating the drop of the first phase.

In one embodiment, the at least one surfactant is non-miscible with the first phase. In one embodiment, the at least one surfactant is non-volatile. In one embodiment, the at least one non-volatile surfactant is fluorinated, selected from the following surfactants, but without being limited thereto: 1H,1H,2H,2H-perfluoro-1-octanol; 1H, 1H-perfluoro-1-tetradecanol; perfluorodecanoic acid; 2-(Perfluorooctyl) ethyl alcohol; 2,2,3,3,4,4,4-heptafluoro-1-butanol; or indeed a compound of the same family. In one embodiment, the first phase does not comprise surfactant. In one embodiment, the first phase is an aqueous solution. In one embodiment, the second phase is a volatile oil. In one embodiment, the volatile oil is a fluorinated oil, preferably of the $C_nF_{2n+2}$ or $C_nF_{2n+1}OC_nH_{2n'+1}$ type or indeed a mixture.

The invention also relates to a method for detecting at least one analyte comprising:

at least one step of concentrating at least one analyte using the concentration method according to the present invention; and detecting the at least one concentrated analyte by means of a physicochemical or biological analysis method.

In one embodiment, the steps of concentrating at least one analyte as defined in the present invention may be repeated several times with the same at least one analyte prior to detection of said at least one analyte. In one embodiment, the substrate comprises a plurality of wells each of dimensions configured to receive a plurality of drops of the first phase and of the second phase.

The invention also relates to a system using the method for detecting at least one analyte according to the present invention comprising:

a microfluidic device configured to deposit at least one drop of the first phase and of the second phase on a substrate;

a substrate, said substrate being a plate comprising a plurality of wells each of dimensions configured to receive a plurality of drops of the first phase and of the second phase;

a means for moving the substrate configured to move said substrate relative to the microfluidic device; and a device for physicochemical or biological detection of the at least one concentrated analyte.

Definitions

In the present invention, the terms hereinafter are defined as follows:

"Volatile" relates to a compound which has a saturation vapour pressure value from 10 mbar to 500 mbar at 20° C., preferably from 100 mbar to 500 mbar at 20° C.; and evaporates at ambient temperature and atmospheric pressure.

"Non-volatile" relates to a compound which does not evaporate at ambient temperature and atmospheric pressure.

"Surfactant" relates to a molecule for lowering the surface tension of a liquid phase.

"Analyte" relates to a compound of interest present in a sample to be analysed. It may be of any type or of any size among, without being limited thereto: crystals; biomolecules; peptides; proteins; nanoparticles or microparticles.

DETAILED DESCRIPTION

According to a first aspect, the present invention relates to a method for concentrating at least one analyte.

The method for concentrating at least one analyte comprises the following steps:

preparing a first liquid phase comprising at least one analyte;

depositing a drop of said first phase on a substrate;

depositing on said drop of first phase a drop of a second liquid phase comprising at least one surfactant, said second phase being non-miscible with said first phase;

evaporating the drop of the second phase; and evaporating the drop of the first phase.

The method for concentrating at least one analyte is illustrated in FIG. 8.

The evaporation of the drop of the second phase induces the concentration of at least one surfactant at the level of the contact line of the drop of the first phase on the substrate. This concentration of surfactant molecules creates a surface tension gradient by means of the solutocapillary effect. This induces the appearance of recirculations generated by the Marangoni flows of the regions of lowest surface tension towards the regions of greatest surface tension, that is to say from the perimeter of the drop to the apex of the drop. The analytes are then concentrated at the centre of the surface initially occupied by the drop of the first phase, favouring the detection thereof.

Furthermore, the method according to the present invention makes it possible to limit and/or prevent the contamination of the analyte in the drop of the first phase as the surfactant is not present in the first phase.

According to one embodiment, the steps of depositing a drop of said first phase and of depositing on said drop of first phase a drop of a second phase are successive.

According to one embodiment, the steps of depositing a drop of said first phase and of depositing on said drop of first phase a drop of a second phase are independent.

According to one embodiment, the steps of depositing a drop of said first phase and of depositing on said drop of first phase a drop of a second phase are not successive.

According to one embodiment, the steps of depositing a drop of said first phase and of depositing on said drop of first phase a drop of a second phase are simultaneous.

According to one embodiment, the steps of depositing a drop of said first phase and of depositing on said drop of first phase a drop of a second phase are not independent.

According to one embodiment, the examples of analytes comprise without being limited thereto: peptide, peptide mixture, high-molecular-weight polypeptide chain for example a protein, or mixture thereof.

According to one embodiment, the first phase is prepared by mixing a solution of at least one analyte with the liquid of the first phase.

According to one embodiment, the first phase is prepared by mixing a solution of at least one analyte, as well as any other compound, apart from a surfactant, such as a MALDI-TOF matrix with the liquid of the first phase.

According to one embodiment, the MALDI-TOF matrix is selected among the following matrixes, but without being limited thereto: 1,5-diaminonaphthalene; 2-mercaptobenzothiazole; 4-aminoquinaldine; 2-(2-aminoethylamino)-5-nitropyridine; 2',4',6'-trihydroxyacetophenone; aminoacridine; α-cyano-4-hydroxycinnamic acid or indeed a compound of the same family.

According to one embodiment, the deposition of the drops of the first phase and of the second phase is performed without being limited thereto, by means of a pipette or by means of a microfluidic system.

According to one embodiment, during the deposition of the drop of the first phase, said drop is not encapsulated, contained, surrounded, enveloped or dispersed in the second phase.

According to one embodiment, during the deposition of the drop of the second phase, said drop is not encapsulated, contained, surrounded, enveloped or dispersed in the first phase.

According to one embodiment, the drops of the first phase have a diameter ranging from 10 μm to 1 mm, preferably from 50 μm to 800 μm, even more preferentially from 100 μm to 400 μm.

According to one embodiment, the drops of the second phase have a diameter ranging from 10 μm to 1 mm, preferably from 50 μm to 800 μm, even more preferentially from 100 μm to 400 μm.

According to one embodiment, the drops of the second phase have a different diameter from the diameter of the drops of the first phase.

According to one embodiment, the drops of the second phase have a greater diameter than the diameter of the drops of the first phase. This embodiment has the advantage of enabling the drop of second phase to fully encompass the drop of first phase.

According to one embodiment, the drops of the first phase have a volume ranging from 1 µL to 1 µL, preferably from to 1 nL to 10 nL.

According to one embodiment, the drops of the first phase have a volume greater than 5 nL.

According to one embodiment, the drops of the second phase have a volume ranging from 1 µL to 1 µL, preferably from to 1 nL to 10 nL.

According to one embodiment, the drops of the second phase have a volume greater than 5 nL.

According to one embodiment, the drops of the second phase have a different volume from the volume of the drops of the first phase.

According to one embodiment, the drops of the second phase have a greater volume than the volume of the drops of the first phase.

According to one embodiment, the steps of evaporating the drops of the first phase and of the second phase take place at ambient temperature and atmospheric pressure.

According to one embodiment, the evaporation of the drops of the first phase and/or of the second phase may be accelerated by heating and/or by applying a gas stream in the vicinity of the drops such as a stream of $N_2$, Ar, $O_2$, air, or any gas known to those skilled in the art or a mixture thereof.

According to one embodiment, the first phase does not comprise surfactant. This embodiment makes it possible to prevent contamination of the first phase by external compounds such as surfactants.

According to one embodiment, the first phase does not comprise the liquid of the second phase.

According to one embodiment, the second phase does not comprise the liquid of the first phase.

According to one embodiment, the first phase is an aqueous solution. In this embodiment, the second phase non-miscible with the first phase is an oil.

According to one embodiment, the examples of aqueous solution include but are not limited to: a mixture of water and at least one water-miscible solvent such as for example a water-acetonitrile mixture. A water-acetonitrile mixture is particularly advantageous as acetonitrile is water-miscible and enables easier dispersion of low-hydrophilicity compounds in the aqueous solution due to the more hydrophobic nature thereof in respect of water.

According to one embodiment, the examples of second phase include but are not limited to: volatile oils such as fluorinated oils; non-water-miscible ethers such as, for example, ethyl ether; and light alkanes such as, for example, pentane or hexane.

According to one embodiment, the surfactant is miscible in the second phase.

According to one embodiment, the second phase is a volatile oil. This embodiment enables rapid and homogeneous evaporation of the second phase.

According to one embodiment, the drop of volatile oil evaporates in less than one minute.

According to one embodiment, the evaporation time of the drop of volatile oil varies between 1 and 30 seconds, preferentially between 1 and 10 seconds.

According to one embodiment, the volatile oil is a fluorinated oil. It offers advantages for this application, such as the saturation vapour pressure value thereof, the miscibility thereof with the surfactants used, the lack of contamination after evaporation, or the chemical inertia thereof with respect to the analyte solution.

According to one embodiment, the fluorinated oil is preferably of $C_nF_{2n+2}$ type where n=6 preferentially or $C_nF_{2n+1}OC_nOC_nH_{2n'+1}$ where n=3 or 4 and n'=1 preferentially or indeed a mixture.

According to one embodiment, the at least one surfactant is not miscible with the first phase. In this embodiment, the at least one surfactant is miscible with the second phase. In this embodiment, the contamination of the first phase by surfactant molecules is prevented, the noise on the analytical signal induced by such contamination is therefore eliminated and the detection of the analytes facilitated.

According to one embodiment, the at least one surfactant is non-volatile. In this embodiment, following the evaporation of the second phase, the non-volatile surfactant is found trapped predominantly close to the contact line of the drop of the first phase containing the analytes on the substrate without however penetrating therein as it is non-miscible therein. This concentration of surfactant molecules creates a surface tension gradient, and induces the appearance of recirculations generated by the Marangoni flows from the perimeter of the drop to the apex of the drop.

According to one embodiment, the at least one non-volatile surfactant is fluorinated, selected from the following surfactants, but without being limited thereto: 1H,1H,2H, 2H-perfluoro-1-octanol; 1H,1H-perfluoro-1-tetradecanol; perfluorodecanoic acid; 2-(Perfluorooctyl) ethyl alcohol; 2,2,3,3,4,4,4-heptafluoro-1-butanol; or indeed a compound of the same family.

According to one embodiment, the substrate is selected among, but without being limited thereto: metal; glass; silicon; polymer such as polydimethylsiloxane; Teflon; stainless steel.

According to one embodiment, the first phase and the substrate have opposite hydrophobicity characteristics. In this embodiment, if the first phase is an aqueous solution, then the substrate is hydrophobic, and conversely, if the first phase is an oily phase, then the substrate is hydrophilic. This embodiment makes it possible to prevent spreading of the drop on the substrate.

According to one embodiment, the surface of the substrate undergoes a chemical and/or physical treatment prior to the deposition of the drops so as to ensure opposite hydrophobicity characteristics between said substrate and the first phase.

Examples of chemical and/or physical treatment are well-known to those skilled in the art and include, without being limited thereto, chemical grafts or physical treatments (UV ozone, plasma, etc.).

According to one embodiment, the substrate may be a plate having a smooth surface or a plate comprising at least one well.

According to one embodiment, the substrate is not a plate comprising hydrophilic zones in a hydrophobic coating.

According to one embodiment, the substrate is not a steel plate coated with a hydrophobic Teflon layer, said layer being structured by laser ablation to form hydrophilic zones on the plate.

According to one embodiment, after evaporation the at least one analyte is concentrated at the centre of the deposition zone of the drop of the first phase.

According to a second aspect, the invention also relates to a method for detecting at least one analyte.

The method for detecting at least one analyte comprises the following steps:
- preparing a first liquid phase comprising at least one analyte;
- depositing a drop of said first phase on a substrate;
- depositing on said drop of first phase a drop of a second liquid phase comprising at least one surfactant, said second phase being non-miscible with said first phase;
- evaporating the drop of the second phase; and
- evaporating the drop of the first phase; and
- detecting and/or analysing the at least one concentrated analyte by means of a physicochemical or biological analysis method.

According to a further aspect, the invention also relates to a method for concentrating and detecting at least one analyte.

The method for concentrating and detecting at least one analyte comprises the following steps:
- preparing a first liquid phase comprising at least one analyte;
- depositing a drop of said first phase on a substrate;
- depositing on said drop of first phase a drop of a second liquid phase comprising at least one surfactant, said second phase being non-miscible with said first phase;
- evaporating the drop of the second phase; and
- evaporating the drop of the first phase; and
- detecting and/or analysing the at least one concentrated analyte by means of a physicochemical or biological analysis method.

According to one embodiment, the steps of concentrating at least one analyte as defined in the first aspect of the present invention may be repeated several times with the same at least one analyte prior to detection of said at least one analyte.

According to one embodiment, the first phase is prepared by mixing a solution of at least one analyte with the liquid of the first phase.

According to one embodiment, the first phase is prepared by mixing a solution of at least one analyte, as well as any other compound, apart from a surfactant, such as a MALDI-TOF matrix with the liquid of the first phase.

According to one embodiment, the MALDI-TOF matrix is selected among the following matrixes, but without being limited thereto: 1,5-diaminonaphthalene; 2-mercaptobenzothiazole; 4-aminoquinaldine; 2-(2-aminoethylamino)-5-nitropyridine; 2',4',6'-trihydroxyacetophenone; aminoacridine; α-cyano-4-hydroxycinnamic acid or indeed a compound of the same family.

According to one embodiment, the deposition of the drops of the first phase and of the second phase is performed without being limited thereto, by means of a pipette or by means of a microfluidic system.

According to one embodiment, during the deposition of the drop of the first phase, said drop is not encapsulated, contained, surrounded, enveloped or dispersed in the second phase.

According to one embodiment, during the deposition of the drop of the second phase, said drop is not encapsulated, contained, surrounded, enveloped or dispersed in the first phase.

According to one embodiment, the drops of the first phase have a diameter ranging from 10 µm to 1 mm, preferably from 50 µm to 800 µm, even more preferentially from 100 µm to 400 µm.

According to one embodiment, the drops of the second phase have a diameter ranging from 10 µm to 1 mm, preferably from 50 µm to 800 µm, even more preferentially from 100 µm to 400 µm.

According to one embodiment, the drops of the second phase have a different diameter from the diameter of the drops of the first phase.

According to one embodiment, the drops of the second phase have a greater diameter than the diameter of the drops of the first phase. This embodiment has the advantage of enabling the drop of second phase to fully encompass the drop of first phase.

According to one embodiment, the drops of the first phase have a volume ranging from 1 µL to 1 µL, preferably from 1 nL to 10 nL.

According to one embodiment, the drops of the first phase have a volume greater than 5 nL.

According to one embodiment, the drops of the second phase have a volume ranging from 1 µL to 1 µL, preferably from to 1 nL to 10 nL.

According to one embodiment, the drops of the second phase have a volume greater than 5 nL.

According to one embodiment, the drops of the second phase have a different volume from the volume of the drops of the first phase.

According to one embodiment, the drops of the second phase have a greater volume than the volume of the drops of the first phase.

According to one embodiment, the steps of evaporating the drops of the first phase and of the second phase take place at ambient temperature and atmospheric pressure.

According to one embodiment, the evaporation of the drops of the first phase and/or of the second phase may be accelerated by heating and/or by applying a gas stream in the vicinity of the drops such as a stream of $N_2$, Ar, $O_2$, air, or any gas known to those skilled in the art or a mixture thereof.

According to one embodiment, the first phase does not comprise surfactant.

According to one embodiment, the first phase does not comprise the liquid of the second phase.

According to one embodiment, the second phase does not comprise the liquid of the first phase.

According to one embodiment, the first phase is an aqueous solution. In this embodiment, the second non-miscible phase with the first phase is an oil.

According to one embodiment, the examples of aqueous solution include but are not limited to: a mixture of water and at least one water-miscible solvent such as for example a water-acetonitrile mixture. A water-acetonitrile mixture is particularly advantageous as acetonitrile is water-miscible and enables easier dispersion of low-hydrophilicity compounds in the aqueous solution due to the more hydrophobic nature thereof in respect of water.

According to one embodiment, the examples of second phase include but are not limited to: volatile oils such as fluorinated oils; non-water-miscible ethers such as, for example, ethyl ether; and light alkanes such as, for example, pentane or hexane.

According to one embodiment, the surfactant is miscible in the second phase.

According to one embodiment, the second phase is a volatile oil.

According to one embodiment, the drop of volatile oil evaporates in less than one minute.

According to one embodiment, the evaporation time of the drop of volatile oil varies between 1 and 30 seconds, preferentially between 1 and 10 seconds.

According to one embodiment, the volatile oil is a fluorinated oil.

According to one embodiment, the fluorinated oil is preferably of $C_nF_{2n+2}$ type where n=6 preferentially or $C_nF_{2n+1}OC_nOC_{n'}H_{2n'+1}$ where n=3 or 4 and n'=1 preferentially or indeed a mixture.

According to one embodiment, the at least one surfactant is not miscible with the first phase. In this embodiment, the at least one surfactant is miscible with the second phase.

According to one embodiment, the at least one surfactant is non-volatile.

According to one embodiment, the at least one non-volatile surfactant is fluorinated, selected from the following surfactants, but without being limited thereto: 1H,1H,2H,2H-perfluoro-1-octanol; 1H,1H-perfluoro-1-tetradecanol; perfluorodecanoic acid; 2-(Perfluorooctyl) ethyl alcohol; 2,2,3,3,4,4,4-heptafluoro-1-butanol; or indeed a compound of the same family.

According to one embodiment, the substrate is selected among, but without being limited thereto: metal; glass; silicon; polymer such as polydimethylsiloxane; Teflon; stainless steel.

According to one embodiment, the first phase and the substrate have opposite hydrophobicity characteristics. In this embodiment, if the first phase is an aqueous solution, then the substrate is hydrophobic, and conversely, if the first phase is an oily phase, then the substrate is hydrophilic. This embodiment makes it possible to prevent spreading of the drop on the substrate.

According to one embodiment, the surface of the substrate undergoes a chemical and/or physical treatment prior to the deposition of the drops so as to ensure opposite hydrophobicity characteristics between said substrate and the first phase.

Examples of chemical and/or physical treatment are well-known to those skilled in the art and include, without being limited thereto, chemical grafts or physical treatments (UV ozone, plasma, etc.).

According to one embodiment, the substrate may be a plate having a smooth surface or a plate comprising at least one well.

According to one embodiment, after evaporation the at least one analyte is concentrated at the centre of the deposition zone of the drop of the first phase.

According to one embodiment, after evaporation the at least one analyte is concentrated at the centre of the well wherein the first drop has been deposited.

According to one embodiment, the physicochemical or biological analysis method for detecting the at least one analyte may be chosen among, without being limited thereto: mass spectrometry, MALDI-TOF mass spectrometry, fluorescence microscopy, microarrays, immunochemical tests or any other analytical chemistry or biology analysis technique.

The method for concentrating at least one analyte as defined in the present invention is particularly advantageous for detecting analytes by means of the above analysis methods. Indeed, the homogeneity and reproducibility of the depositions of analyte solutions are two important parameters for achieving an effective analysis. In particular, matrix-assisted laser desorption/ionisation mass spectrometry coupled with a time-of-flight analyser (MALDI-TOF-MS), an analysis technique routinely used in proteomics and in particular in all the phases of biomarker development, has numerous advantages such as sensitivity, precision and speed of analysis. The detection sensitivity of the MALDI-TOF-MS technique is moreover strongly correlated with the mass of the biomolecule under analysis. However, this technique has some limitations in respect of the reproducibility of the signal obtained essentially associated with heterogeneity during the sample drying process. The concentration method according to the present invention makes it possible to advantageously address this drawback.

According to a third aspect, the invention also relates to an analysis plate, in particular a MALDI plate.

According one embodiment, the analysis plate is smooth.

According to one embodiment, the analysis plate comprises a plurality of wells. This analysis plate makes it possible to make homogeneous and reproducible depositions. It also has the advantage of enabling multiple depositions by repeating the depositions of drops of solution in the same well, resulting in an increase in the analyte concentration in said well.

According to one embodiment, each well is configured to receive at least one drop of a solution.

According to one embodiment, each well has a diameter ranging from 1 µm to 10 mm, from 500 µm to 1 mm or about 700 µm.

According to one embodiment, each well has a height ranging from 1 µm to 500 µm, from 50 µm to 250 µm or about 100 µm.

According to one embodiment, each well has a volume ranging from 1.5 fL to 5 µL, preferably from 50 fL to 1 µL, preferably from 1 nL to 500 nL.

According to one embodiment, each well has a minimum volume of 100 nL.

According to one embodiment, each well has a height of 100 µm and a diameter of 700 µm.

According to one embodiment, each well has a minimum height of 100 µm.

According to one embodiment, each well has a minimum diameter of 300 µm.

According to one embodiment, each well has a diameter strictly greater than 300 µm.

According to one embodiment, all the wells have the same height and/or the same diameter.

According to one embodiment, the wells have different heights and/or diameters.

According to one embodiment, the height and/or diameter of the wells varies according to the position thereof on the plate.

According to one embodiment, the analysis plate material is selected among, but without being limited thereto: metal; glass; silicon; Teflon; stainless steel.

According to one embodiment, the analysis plate comprising a plurality of wells is manufactured by photolithography, preferentially by photolithography of a silicon wafer topped with a photosensitive resin.

According to one embodiment, the analysis plate is not a plate comprising hydrophilic zones in a hydrophobic coating.

According to one embodiment, the analysis plate is not a steel plate coated with a hydrophobic Teflon layer, said layer being structured by laser ablation to form hydrophilic zones on the plate.

According to one embodiment, the analysis plate comprising a plurality of wells is manufactured by machining, preferentially by machining a stainless-steel plate.

In one embodiment, the plate according to the present invention is advantageously used as substrate according to the first or second aspect of the present invention.

In one embodiment, each well is configured to receive a plurality of drops of the first phase and of the second phase. The embodiment has the advantage of enabling multiple depositions by repeating the depositions of drops of solution in the same well, each of the depositions being separated by a step of evaporating the drop of the second phase and a step of evaporating the drop of the first phase. This embodiment results in an increase in the analyte concentration in said well.

According to a fourth aspect, the invention also relates to a system using the method for detecting at least one analyte according to the present invention.

The system using the method for detecting at least one analyte according to the present invention comprises:
- a microfluidic device configured to deposit at least one drop of the first phase and of the second phase comprising at least one surfactant on a substrate;
- a substrate, said substrate being a plate comprising a plurality of wells each being of dimensions configured to receive a plurality of drops, preferentially at least two drops of which one drop of the first phase and one drop of the second phase;
- a means for moving the substrate configured to move said substrate relative to the microfluidic device; and
- a device for physicochemical or biological detection of the at least one concentrated analyte.

According to a further aspect, the invention also relates to a system for concentrating and detecting at least one analyte according to the present invention.

The system for concentrating and detecting at least one analyte according to the present invention comprises:
- a microfluidic device configured to deposit at least one drop of the first phase and of the second phase comprising at least one surfactant on a substrate;
- a substrate, said substrate being a smooth plate or comprising a plurality of wells each of the wells being configured to receive at least two drops, of which one drop of the first phase and one drop of the second phase;
- a means for moving the substrate configured to move said substrate relative to the microfluidic device; and
- a device for physicochemical or biological detection of the at least one concentrated analyte.

According to one embodiment, the system further comprises a first reservoir configured to receive the first phase comprising at least one analyte and a second reservoir configured to receive the second phase comprising at least one surfactant, each reservoir being in fluidic communication with the microfluidic device.

According to one embodiment, the first reservoir and the second reservoir are independent.

According to one embodiment, the first reservoir and the second reservoir are tubes, channels or any receptacle known to those skilled in the art.

According to one embodiment illustrated in FIG. 7, the microfluidic device comprises 2 tubes or channels (5, 6), the first tube (or channel) 5 being configured to transport the first phase 1 independently of the second phase 4 and the second tube (or channel) 6 being configured to transport the second phase 4 independently of the first phase 1.

According to one embodiment illustrated in FIG. 7, the 2 tubes or channels (5, 6) meet prior to deposition at a junction 7 at which a drop of the first phase 1 is generated.

According to one embodiment, the microfluidic device comprises a third tube or channel 8 wherein the drop of the first phase 1 generated at the junction 7 of the first two tubes or channels (5, 6) is transported in the second phase 4.

According to one embodiment, the microfluidic device is a digital microfluidic device.

According to one embodiment, the microfluidic device is configured to deposit successively and independently at least one drop of the first phase and of the second phase comprising at least one surfactant on a substrate.

According to one embodiment, the microfluidic device is configured to deposit successively and independently at least one drop of the first phase and of the second phase comprising at least one surfactant on a substrate, the drop of the second phase being deposited on the drop of the first phase.

According to one embodiment, the substrate is an analysis plate according to the third aspect of the present invention.

According to one embodiment, the substrate may be a plate having a smooth surface or a plate comprising at least one well.

According to one embodiment, the substrate is an analysis plate as described above.

According to one embodiment, the analysis plate comprises a plurality of wells. This analysis plate makes it possible to make homogeneous and reproducible depositions. It also has the advantage of enabling multiple depositions by repeating the depositions of drops of solution in the same well, resulting in an increase in the analyte concentration in said well.

According to one embodiment, each well is configured to receive at least one drop of a solution.

According to one embodiment, each well has a volume ranging from 1.5 fL to 5 µL, preferably from 50 fL to 1 µL, preferably from 1 nL to 500 nL.

According to one embodiment, each well has a minimum volume of 100 nL.

According to one embodiment, each well comprises a dimension of about 700 µm.

According to one embodiment, each well has a height of 100 µm and a diameter of 700 µm.

According to one embodiment, each well has a minimum height of 100 µm.

According to one embodiment, each well has a minimum diameter of 300 µm.

According to one embodiment, each well has a diameter strictly greater than 300 µm.

According to one embodiment, all the wells have the same height and/or the same diameter.

According to one embodiment, the wells have different heights and/or diameters.

According to one embodiment, the height and/or diameter of the wells vary according to the position thereof on the plate.

According to one embodiment, after evaporation the at least one analyte is concentrated at the centre of the deposition zone of the drop of the first phase.

According to one embodiment, after evaporation the at least one analyte is concentrated at the centre of the well wherein the first drop has been deposited.

According to one embodiment, the substrate is selected among, but without being limited thereto: metal; glass; silicon; polymer such as polydimethylsiloxane; Teflon; stainless steel.

According to one embodiment, the substrate is not a plate comprising hydrophilic zones in a hydrophobic coating.

According to one embodiment, the substrate is not a steel plate coated with a hydrophobic Teflon layer, said layer being structured by laser ablation to form hydrophilic zones on the plate.

According to one embodiment, during the deposition of the drop of the first phase, said drop is not encapsulated, contained, surrounded, enveloped or dispersed in the second phase.

According to one embodiment, during the deposition of the drop of the second phase, said drop is not encapsulated, contained, surrounded, enveloped or dispersed in the first phase.

According to one embodiment, during the deposition of the drop of the first phase, said drop is encapsulated, contained, surrounded, enveloped or dispersed in the second phase.

According to one embodiment, during the deposition of the drop of the second phase, said drop is encapsulated, contained, surrounded, enveloped or dispersed in the first phase.

According to one embodiment, the drop of the first phase is formed independently of the drop of the second phase.

According to one embodiment, the drop of the second phase is formed independently of the drop of the first phase.

According to one embodiment, the drop of the first phase is deposited independently of the drop of the second phase.

According to one embodiment, the drop of the second phase is deposited independently of the drop of the first phase.

According to one embodiment, the drop of the first phase and the drop of the second phase are formed simultaneously.

According to one embodiment, the drop of the first phase and the drop of the second phase are deposited simultaneously.

According to one embodiment, the drop of the first phase is formed in the second phase.

According to one embodiment, the drop of the second phase is formed in the first phase.

According to one embodiment, the drop of the first phase is deposited in the second phase.

According to one embodiment, the drop of the second phase is deposited in the first phase.

According to one embodiment, the drop of the first phase is transported in the second phase.

According to one embodiment, the means for moving the substrate relative to the microfluidic device is a motorised mechanical means.

According to one embodiment, the physicochemical or biological analysis method for detecting the at least one analyte may be chosen among, without being limited thereto: mass spectrometry, MALDI-TOF mass spectrometry, fluorescence microscopy, microarrays, immunochemical tests or any other analytical chemistry or biology analysis technique.

EXAMPLES

The present invention will be understood more clearly on reading the following examples illustrating the invention in a non-limiting manner.

Example 1: Enhancement of MALDI-TOF Mass Spectrometry Analysis Sensitivity by Concentrating the Analyte on a MALDI Plate Materials and Methods
Materials
   a MALDI matrix solution (2 mg/ml α-cyano-4-hydroxycinnamic acid) comprising a mixture of acetonitrile and acidified distilled water in a 50:50 ratio;
   an oil containing 10% (m/m) 2-(Perfluorooctyl) ethyl alcohol; and
   a stock solution of angiotensin II, comprising the peptide at a concentration of 1 pmol/L in a solution of 0.1% trifluoroacetic acid.

Methods

For each series of experiments, all the materials are prepared immediately prior to the analyses.

The matrix solution is prepared by diluting the matrix to a concentration of 2 mg/ml in a mixture of acetonitrile and acidified distilled water in a 50:50 ratio. The mixture needs to be vortexed for 5 min, then placed for 10 min in an ultrasound bath for the solubilisation to be complete.

The peptide stock solution is prepared by diluting angiotensin II to a concentration of 1 pmol/L in a solution of 0.1% trifluoroacetic acid and is stored at −20° C.

Peptide aliquots at 100 fmol/μL are then prepared from an aliquot at 1 pmol/μL by diluting same in a distilled water/acetonitrile mixture (75:25). For each series of analyses, a fresh aliquot is diluted to the desired concentration with an acidified distilled water/acetonitrile mixture (75:25) containing the 2 mg/ml matrix.

A first deposition is carried out conventionally, namely a drop of solution containing the peptides is deposited on a metal substrate using a pipette. An evaporation ensues, which will enable the non-volatile analytes to be trapped on the surface of the substrate.

A second deposition is carried out by depositing successively a drop of solution containing the peptides and a drop of volatile oil free from surfactant on this first drop on a metal substrate using a pipette.

A third deposition is carried out according to the method for concentrating at least one analyte as defined in the present invention.

The first deposition and the third deposition are then analysed by MALDI-TOF-MS.

Results

The first two depositions described above induce a distribution of the analytes over the entire contact surface between the drop and the substrate, frequently resulting in coffee ring phenomena described above. The method for concentrating at least one analyte as defined in the present invention enables a concentration of said analyte at the centre of the surface occupied initially by the drop.

Figure 1:
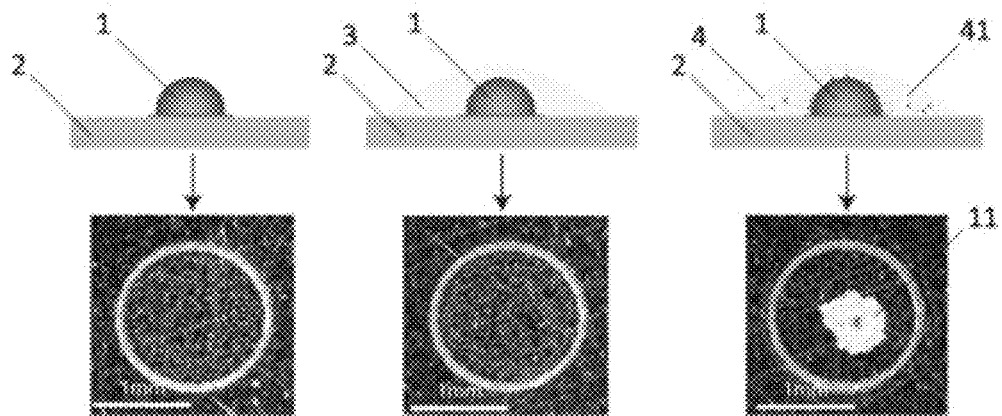
FIG. 1 comprises a schematic representation of drop deposition according to the prior art, a deposition of two non-miscible drops and the deposition according to the present invention, and the images corresponding to said depositions after the evaporation of the second phase and of the first phase.

FIG. 1 illustrates the three depositions carried out:
the deposition according to the prior art comprising a drop of the first phase (1) containing at least one analyte (11) deposited on a substrate (2);
the second deposition comprising a drop of the first phase (1) containing at least one analyte (11) topped with a drop of the second phase (3), free from surfactant, non-miscible with the first phase (1) deposited on a substrate (2);
the third deposition on a substrate (2) according to the method for concentrating at least one analyte (11) as defined in the present invention comprising a drop of the first phase (1) containing at least one analyte (11) topped with a drop of the second phase (4) containing at least one surfactant (41), said second phase (4) being non-miscible with the first phase (1).

Figure 2:
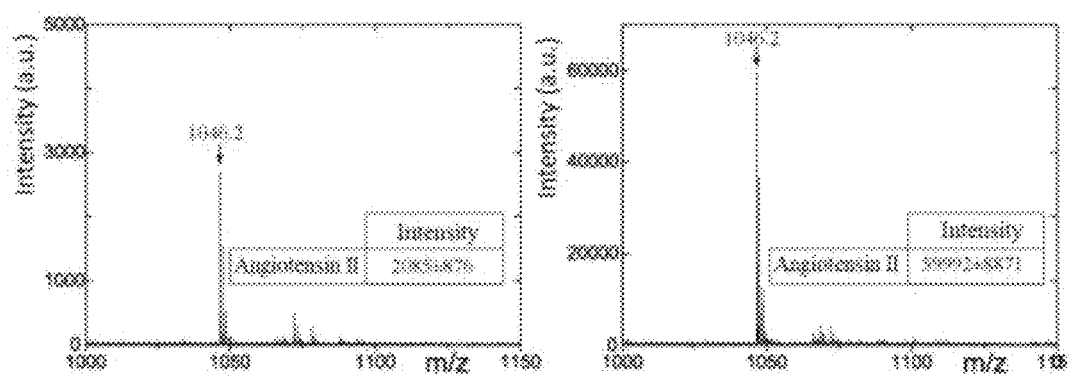
FIG. 2 illustrates the influence of the method for concentrating at least one analyte on the detection of said analyte by MALDI-TOF mass spectrometry.

In the mass spectra presented in FIG. 2, the signal intensity changes from 2085 to 60,000 for the conventional deposition and the deposition according to the method of the present invention, respectively, or an increase in the signal by a factor of 30.

Example 2: Deposition on MALDI Plate Using a Digital Microfluidic System

Materials and Methods
Materials
a MALDI matrix solution (2 mg/ml α-cyano-4-hydroxycinnamic acid) comprising a mixture of acetonitrile and acidified distilled water in a 50:50 ratio;
four solutions containing an analyte such as angiotensin II at different concentrations (from 1 nM to 20 nM);
an oil containing 10% (m/m) 2-(Perfluorooctyl) ethyl alcohol.

Methods
Four solutions containing angiotensin II at different concentrations (from 1 nM to 20 NM) were used separately to generate drops in a digital microfluidic system then deposited according to the concentration method according to the present invention on a commercial MALDI plate made of stainless steel for analysis. For each concentration, 10 repetitions were carried out, at the end whereof, the number of drops deposited and therefore the precise quantity of analyte deposited is calculated then correlated with the corresponding intensities obtained by the MALDI-TOF analysis.

Figure 3:
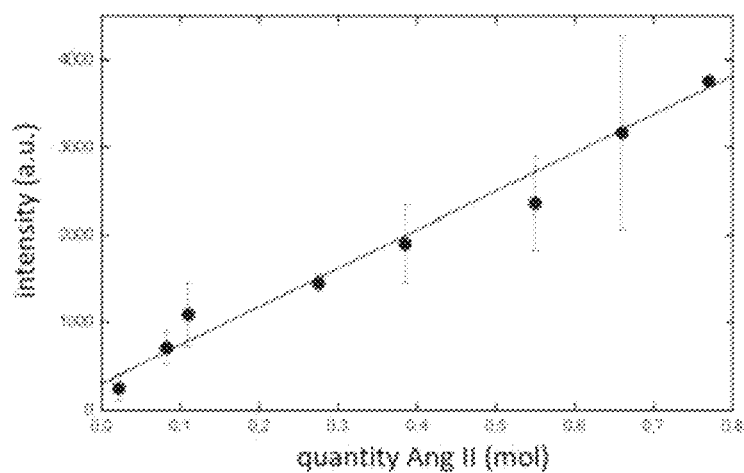
FIG. 3 illustrates the influence of the method for concentrating at least one analyte on the linearity and reproducibility of the signal obtained by MALDI-TOF mass spectrometry.

Results
The limits of detection in terms of sensitivity of the apparatus are achieved according to the manufacturer documentation for the instrument used. The concentration method according to the present invention therefore makes it possible to detect very small quantities of peptide from a sub-nanomolar solution. Furthermore, a strong correlation between the intensity of the signal obtained with MALDI-TOF and the quantity of peptide deposited was observed (represented in FIG. 3), which confirms the reproducibility of the experiment, not achievable for a deposition method according to the prior art.

Example 3: Deposition on Plate Including Wells Using a Digital Microfluidic System Materials and Methods
Materials
a MALDI matrix solution (2 mg/ml α-cyano-4-hydroxycinnamic acid) comprising a mixture of acetonitrile and acidified distilled water in a 50:50 ratio;
a solution of peptide, angiotensin II, at 0.1 nM;
an oil containing 10% (m/m) 2-(Perfluorooctyl) ethyl alcohol;
a silicon wafer; and
a photosensitive resin.

Methods
On a silicon wafer, previously cleaned, is deposited an SU-8 3035 type photosensitive wafer. The wafer is then placed in a spin-coater suitable for obtaining a uniform layer of resin on the silicon wafer. The wafer is then deposited on a heating plate for 30 minutes at 95° C. It is then placed in an ultraviolet exposure box and covered with a mask whereon is printed the shape of the wells. The wafer is then illuminated for 17 seconds at a power of 20 mW/cm$^2$. The wafer is then deposited in a bath containing the development solution. After 10 minutes, the resin that has not been irradiated is dissolved and the wells appear. The wafer is cleaned with isopropanol then dried. The plate obtained comprises a plurality of wells 700 µm in diameter and 100 µm in height.

These wells make it possible to collect the drops generated by the digital microfluidic system. A plurality of depositions according to the concentration method according to the present invention are carried out in the same well.

Figure 4:
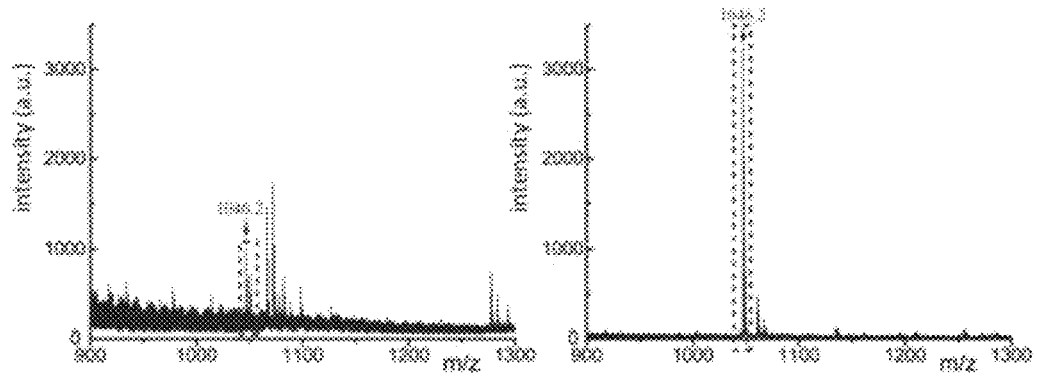
FIG. 4 illustrates the influence of the multi-deposition technique on the analysis plate according to the present invention on the detection of said analyte by MALDI-TOF mass spectrometry.

Results
By repeating the depositions of drops in the same well, the quantity of analytes present in this well is increased significantly. FIG. 4 compares a "single" deposition by the microfluidic system and a multi-deposition by the microfluidic system on the well plate, and the two depositions carried out according to the concentration method according to the present invention. The signal-to-noise ratio is enhanced and the intensity is increased by an order of magnitude.

Example 4: Deposition of a Peptide Mixture on MALDI Plate Using a Digital Microfluidic System Materials and Methods
Materials
a MALDI matrix solution (2 mg/ml α-cyano-4-hydroxycinnamic acid) comprising a mixture of acetonitrile and acidified distilled water in a 50:50 ratio;
a solution containing an analyte such as a peptide mixture of concentration 2.5 nM;
an oil containing 10% (m/m) 2-(Perfluorooctyl) ethyl alcohol.

Methods
The deposition is carried out by forming drops, generated by a digital microfluidic system, of solution containing the peptide mixture then deposited according to the concentration method according to the present invention on a commercial MALDI plate made of stainless steel for analysis. An evaporation ensues, which will enable the non-volatile analytes to be trapped on the surface of the substrate.

Results
The MALDI-TOF analysis of such depositions enables the detection of 10 peptides from a deposited quantity of 250 attomoles of mixture. The gain of the present invention for the peptide mixture study is thus demonstrated given that the analysis involving a conventional deposition (drop of solution containing the peptides and drop of matrix solution are deposited on a metal substrate using a pipette) of a greater quantity of the same mixture (2500 atommoles) only allows the detection of 4 peptides.

Figure 5:
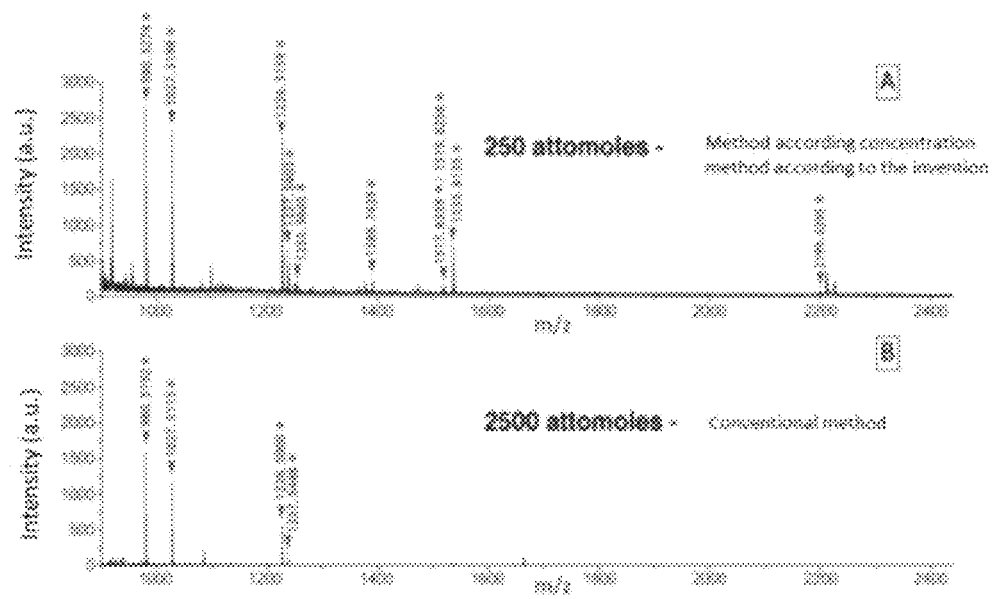
FIG. 5 shows the MALDI-TOF analysis spectra of a peptide mixture concentrated as per the method according to the present invention.

FIG. 5 shows the MALDI-TOF analysis spectra. The red markers correspond to the masses of the peptides detected.

Example 5: Deposition of a Protein on MALDI Plate

Figure 6:
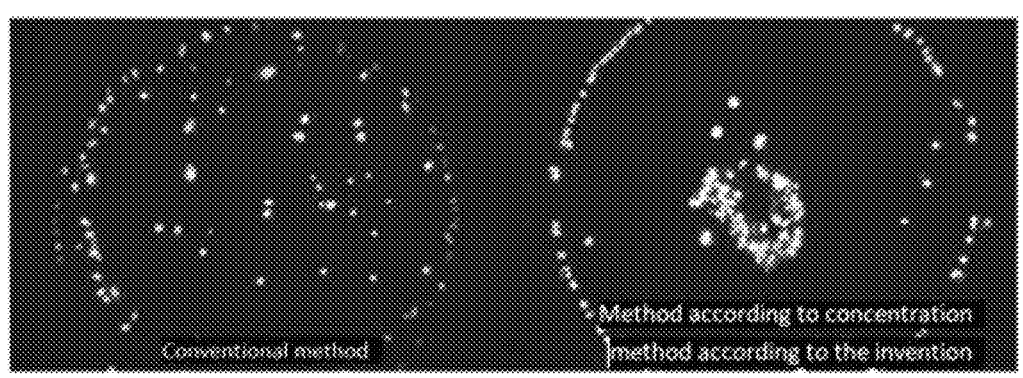
FIG. 6 illustrates the influence of the method for concentrating at least one analyte according to the present invention on the concentration of an analyte at the centre of the deposition zone.
Figure 7:
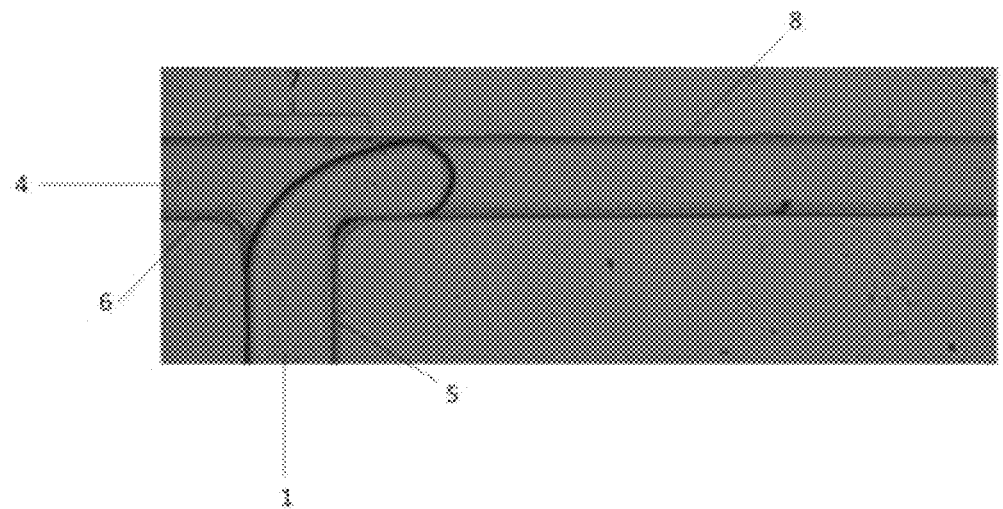
FIG. 7 represents a microfluidic device comprising 2 tubes or channels (5, 6), a junction 7 and a third tube or channel 8.
Figure 8:
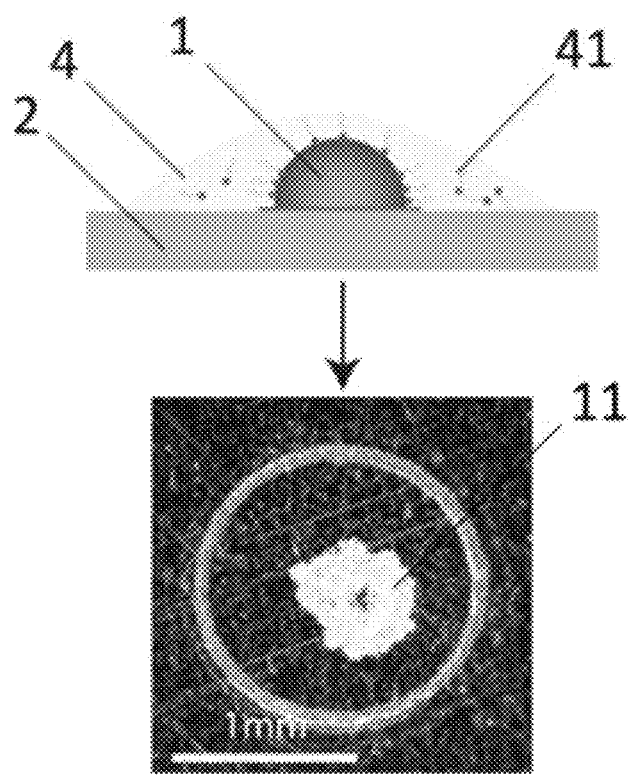
FIG. 8 comprises a schematic representation of the deposition according to the present invention, and the image corresponding to said deposition after the evaporation of the second phase and the first phase.

Materials and Methods
Materials
a MALDI matrix solution (2 mg/ml α-cyano-4-hydroxy-cinnamic acid) comprising a mixture of acetonitrile and acidified distilled water in a 50:50 ratio;
a solution containing an analyte such as a polypeptide chain (MMP12 protein labelled with a fluorophore: fluorescein);
an oil containing 10% (m/m) 2-(Perfluorooctyl) ethyl alcohol.
Methods
The deposition of a protein solution is carried out according to the concentration method according to the present invention. An evaporation ensues, which will enable the non-volatile analytes to be trapped on the surface of the substrate.
Results
The method for concentrating at least one analyte as defined in the present invention enables a concentration of a protein at the centre of the surface occupied initially by the drop, which is not observed in the case of a deposition by means of a conventional method (FIG. 6). Indeed, the deposition of the same protein solution by means of a conventional method (namely a drop of solution containing the protein is deposited on a metal substrate using a pipette) results in a distribution of the protein over the entire contact surface between the drop and the substrate, frequently leading to coffee ring phenomena described above.

The invention claimed is:

1. A method for concentrating at least one analyte comprising the following steps:
preparing a first phase comprising at least one analyte, wherein the first phase is an aqueous solution and does not comprise surfactant;
depositing a drop of said first phase on a substrate;
depositing on said drop of first phase a drop of a second liquid phase comprising 2-(Perfluorooctyl) ethyl alcohol as a non-volatile fluorinated surfactant, said second phase being a volatile oil;
evaporating the drop of the second phase; and
evaporating the drop of the first phase,
wherein the deposited drop of the first phase has a deposition zone with a center, and after evaporation the at least one analyte is concentrated at the center of the deposition zone of the drop of the first phase.

2. The method for concentrating at least one analyte according to claim 1, wherein the volatile oil is a fluorinated.

3. The method for concentrating at least one analyte according to claim 1, wherein the steps of depositing a drop of said first phase and of depositing on said drop of first phase a drop of a second phase are successive.

4. The method for concentrating and detecting at least one analyte according to claim 1, wherein the substrate comprises a plurality of wells each of dimensions configured to receive a plurality of drops of the first phase and of the second phase.

5. A method for concentrating and detecting at least one analyte comprising:
at least one step of concentrating at least one analyte using the concentration method according to claim 1; and
detecting and/or analysing the at least one concentrated analyte by means of a physicochemical or biological analysis method.

6. The method for concentrating at least one analyte according to claim 2, wherein the volatile oil is a fluorinated oil of formula $C_nF_{2n+2}$ or $C_nF_{2n+1}OC_{n'}H_{2n'+1}$.

* * * * *